United States Patent [19]

Anderson

[11] Patent Number: 5,465,335
[45] Date of Patent: Nov. 7, 1995

[54] HARDWARE-CONFIGURED OPERATING SYSTEM KERNEL HAVING A PARALLEL-SEARCHABLE EVENT QUEUE FOR A MULTITASKING PROCESSOR

[75] Inventor: Mark F. Anderson, Biose, Id.

[73] Assignee: Hewlett-Packard Company, Palo Alto, Calif.

[21] Appl. No.: 258,919

[22] Filed: Jun. 13, 1994

Related U.S. Application Data

[63] Continuation of Ser. No. 776,931, Oct. 15, 1991, abandoned.

[51] Int. Cl.$^6$ ............................................. G06F 7/00
[52] U.S. Cl. ..................... 395/375; 395/650; 395/800; 364/DIG. 1:DIG. 2
[58] Field of Search ........................... 395/800, 650, 395/375

[56] References Cited

U.S. PATENT DOCUMENTS

| | | | |
|---|---|---|---|
| 4,084,228 | 4/1978 | Dufond et al. | 395/650 |
| 4,374,409 | 2/1983 | Bienvenu et al. | 395/650 |
| 4,387,427 | 6/1983 | Cox et al. | 395/650 |
| 4,658,351 | 4/1987 | Teng | 395/650 |
| 4,908,750 | 3/1990 | Jablow | 395/650 |
| 4,965,716 | 10/1990 | Sweeny | 395/650 |
| 5,012,409 | 4/1991 | Fletcher et al. | 395/650 |
| 5,185,871 | 2/1993 | Frey et al. | 395/375 |
| 5,237,684 | 8/1993 | Record et al. | 395/650 |
| 5,291,614 | 3/1994 | Baker et al. | 395/800 |

FOREIGN PATENT DOCUMENTS 63-208948  8/1988  Japan.

OTHER PUBLICATIONS

Structured Computer Organization by Andrew S. Tanenbaum, Prentice—Hall, Inc. 1984, pp. 10–12.
Test and Evaluation of the SVID–Compliant REAL/IX Real Time Operating System by Zuccarelli et al, IEEE 1990, pp. 81–85.
FASTCHART—A Fast Time Deterministic CPU and Hardware Based Real–Time–Kernel by Lennant Linch et all, IEEE Publication, Jun. 1991, pp. 36–40.

*Primary Examiner*—David Y. Eng
*Assistant Examiner*—Zarni Maung

[57] ABSTRACT

A multitasking data processing system is provided with a hardware-configured operating system kernel. The system includes a processor queue that includes a plurality of word stores, each word store storing a task name, in execution priority order, that is ready for processing. An event queue in the kernel includes a plurality of word stores for storing task names that await the occurrence of an event to be placed in the processor queue. When an associated processor signals the occurrence of an event, matching logic searches all word stores in the event queue, in parallel, to find a task associated with the signalled event and then transfers the task to the processor queue. Shift logic is also provided for simultaneously transferring a plurality of task names, in parallel, in the processor queue to make room for a task name transferred from the event queue.

17 Claims, 7 Drawing Sheets

HARDWARE-CONFIGURED OPERATING SYSTEM KERNEL HAVING A PARALLEL-SEARCHABLE EVENT QUEUE FOR A MULTITASKING PROCESSOR

CROSS REFERENCE TO RELATED APPLICATION

This is a continuation of application Ser. No. 07/776,931 filed on Oct. 15, 1991, now abandoned.

FIELD OF THE INVENTION

This invention relates to processors that are programmed to operate on many tasks in parallel, and more particularly, to a hardware implementation of a portion of the processor's operating system to enable multitasking operations to proceed more rapidly.

BACKGROUND OF THE INVENTION

Real-time data processors are able to handle the processing of a number of tasks on a concurrent basis. Multiprocessors perform this function by providing a number of processors that operate on the tasks in parallel. Single processor systems, operating in real-time, handle "parallel" processing on a multitasking basis. Multitasking is a process of executing several tasks concurrently or in parallel. The concurrently processed tasks execute logically at the same time, even though they may not execute physically at the same time.

Multitasking operations perform under control of the computer's operating system and, in particular, under control of an "Executive" segment thereof that controls the scheduling of the concurrently running tasks. The Executive segment (hereinafter called EXEC) provides an interface between the tasks and the central processing unit. To each task, the EXEC appears as the task's own central processing unit. The EXEC handles all of the details involved in sharing the physical CPU with all of the tasks in the system. Thus, an EXEC controls which task should have possession of the CPU at any time by examining priority and readiness levels assigned to each task.

In general, the EXEC enables the running of one task on the CPU until another request to use the CPU is received from a higher priority task. The running task is "suspended", and the higher priority task is allowed to run. This process may occur many times over but sooner or later the highest priority task will complete its processing and voluntarily suspend itself. Thus, even though a lower priority task may be suspended many times before its completion, it eventually completes and produces the same result as if it had run uninterrupted.

Tasks have various execution states. An active task is one which has control of the CPU and is executing. Only one task can be active at any given time on a multitasking CPU. An inactive task is not executing and is not waiting to execute. It is simply idle. A ready task is one which is waiting for CPU time to become available so that it can execute. A waiting task is one that has suspended operation until the occurrence of some event. The event can be generated by another task, or a hardware event. Upon occurrence of the event, the task is moved from the waiting state to either the ready or the active state depending upon the priority of currently active tasks.

Tasks may be synchronized by priority or by task readiness or a combination of both. In general, an EXEC includes a number of utility routines that are used by tasks to perform necessary control functions. Under these utility routines, any task may schedule another task, suspend itself or another task, signal an event, wait for an event or delay an event for a period of time. The principle EXEC utilities are as follows: Schedule, Suspend, Signal, Wait and Delay. The Schedule utility is used by an active task when it wants another task to begin or resume execution. The Schedule utility allows the highest priority ready task to execute. The Suspend utility is used by an active task to remove itself from the ready state or move another task to the inactive state. Control is then given to the current highest-priority ready task.

The Signal utility is used by the active task or an interrupt service routine to generate a particular event. If no task is waiting on the event that is signalled, the EXEC returns control to the active task. If another task is waiting on the signalled event, control returns to the highest priority task.

The Wait utility is used when the active task wishes to suspend execution and resume on an occurrence of a particular event, or events.

The Delay utility is used by the active task when it needs either itself or another task to wait a specific amount of time before resuming execution. This utility allows an asynchronous task to be synchronized using time as a reference.

An operating system incorporates an interrupt facility which is the primary means for synchronizing firmware operations with hardware events. When an interrupt occurs, control is transferred from whatever task is executing to an interrupt handling module. One interrupt module exists for each type of interrupt that can occur.

A variety of data structures are employed by the EXEC to implement the utilities above described. A CPU queue is a list of tasks in the ready state. The highest priority task is the currently active task. If there are two ready tasks of the same priority, the task that is ready first becomes the active task. An Event queue is a list of tasks in a waiting state. A Delay queue is another list of delayed events which, after the duration of a delay, will cause tasks waiting on these events to be moved to the CPU queue to become ready tasks.

The described queues are dynamic in structure and must accommodate at least four basic operations: insertion of an item; deletion of an item; location of an item; and modification of an item. Each queue may be configured as a linear list, a singly linked list, or a doubly linked list. A singly linked list is one where each item contains a pointer to the next item in the list. A doubly linked list has items with two linked fields. Each item in the list has a pointer to the next item to the right and to the next item left of it.

As above indicated, an EXEC is generally configured in software as a portion ("kernel") of the operating system. Often, the EXEC is required to perform queue-wide operations that include comparisons and shifting of the contents of the queue. Such operations are performed serially and their time of execution varies at least linearly with the length of the queue. Such execution times can have a deleterious affect on the performance of the operating system and presents real impediments to the improvement of the system's performance.

Accordingly, it is an object of this invention to provide a multitasking data processing system with an EXEC that is not constrained by serial processing operations.

It is another object of this invention to provide an EXEC that enables more efficient operation of a multitasking data processing system.

It is another object of this invention to provide a multitasking data processing system with a hardware implemented operating system kernel wherein queues maintained in the kernel require no separate priority indication.

SUMMARY OF THE INVENTION

A multitasking data processing system is provided with a hardware-configured operating system kernel. The system includes a processor queue that includes a plurality of word stores, each word store storing a task name, in execution priority order, that is ready for processing. An event queue in the kernel includes a plurality of word stores for storing task names that await the occurrence of an event to be placed in the processor queue. When an associated processor signals the occurrence of an event, matching logic searches all word stores in the event queue, in parallel, to find a task associated with the signalled event and then transfers the task to the processor queue. Shift logic is also provided for simultaneously transferring a plurality of task names, in parallel, in the processor queue to make room for a task name transferred from the event queue.

DETAILED DESCRIPTION OF THE INVENTION

In brief, this invention removes certain critical operating system functions from operating system software and implements them in a hardware structure. Through this mechanism, certain often-found data reorganization operations may be performed in parallel and in a predetermined time interval. The hardware kernel employs, in the main, five commands, i.e., Schedule, Suspend, Signal, Wait and Delay. Through these commands, and combinations thereof, a set of real-time operating system primitives are created which enable substantial improvement in an attached processor's operating parameters. Due to the hardware configuration of the queues in the kernel, queue-wide operations are easily accomplished in a fraction of the time needed for similar operations in a software environment.

EXEC MODULE (KERNEL)

Figure 1:
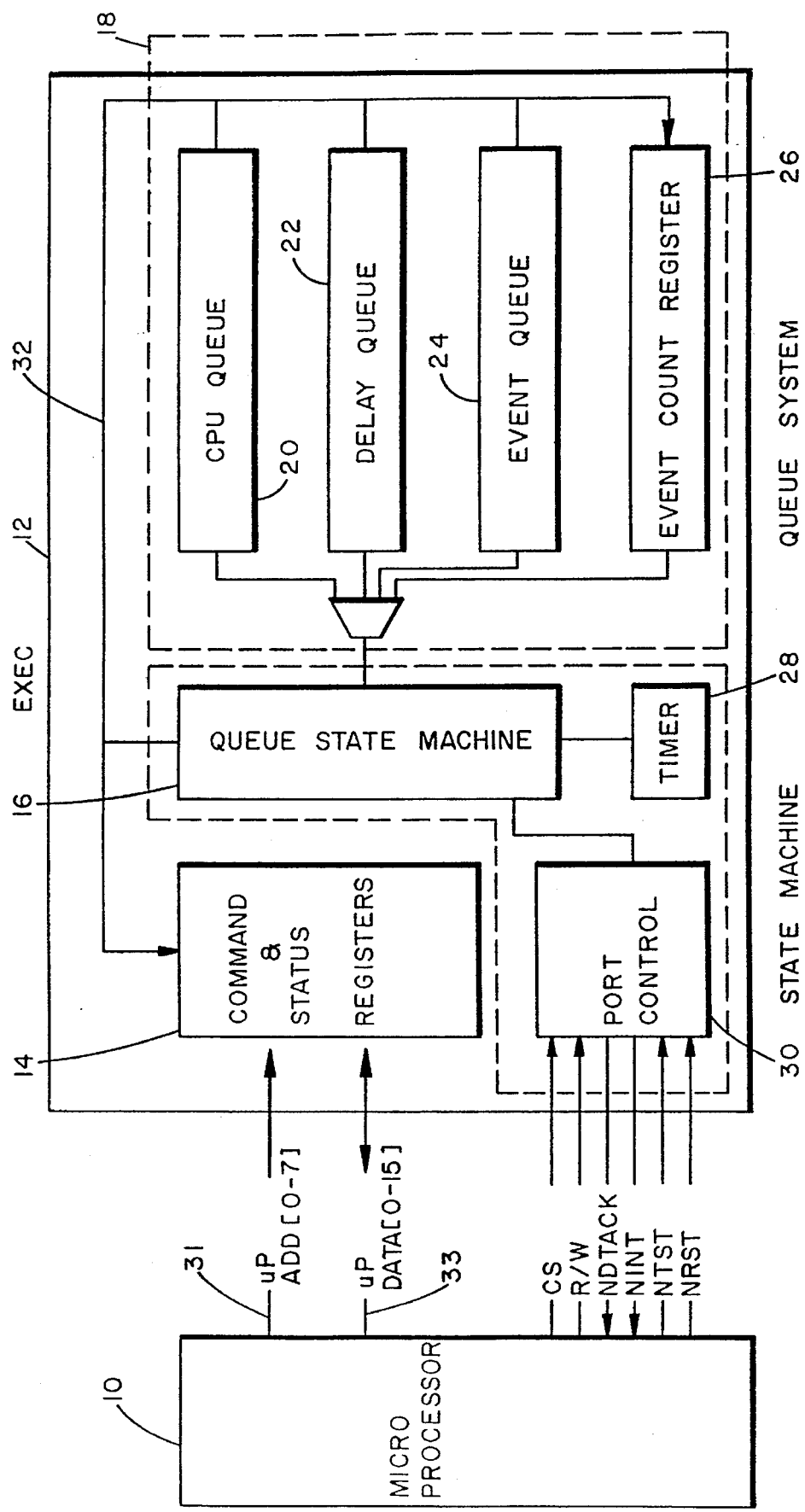
FIG. 1 is a high level block diagram of a system incorporating the invention hereof.

Turning now to FIG. 1, a high level block diagram is shown of the system. A microprocessor 10 has incorporated therewith, an EXEC module 12 which is implemented in hardware. EXEC module 12 contains three main functional blocks, i.e., a command and status register set 14, a queue state machine 16 and a queue system 18. Queue system 18 contains the data structures that all utilities manipulate. There are three physically identical queues in queue system 18, i.e., CPU queue 20, Delay queue 22 and Event queue 24.

CPU queue 20 is a priority-ordered list of names of Task Control Blocks (TCBs) and associated events that cause the TCBs to be placed in the CPU queue. CPU queue 20 controls the sequence that the various tasks execute within microprocessor 10. TCBs contain all the information pertaining to the status of a task and are used within microprocessor 10 to control such tasks. The name of each TCB is a value (e.g., from 0 to 255) which indicates its priority as well as designating the TCB. The priority of the task, referenced in the task's TCB name, is used to determine when a task is given possession of microprocessor 10. The TCB at the "head" of CPU Queue 20 retains possession of microprocessor 10 for that task. If a task of higher priority is placed in the queue, the currently running task is replaced by the higher priority task at the head of CPU Queue 20 and the task of higher priority executes. At any time, the number of tasks' TCBs in CPU Queue 20 may range from all (all tasks ready to execute), to none (no active or ready tasks).

Event queue 24 contains a priority-ordered list of names of TCBs, with each TCB in the list joined to an event name, upon whose occurrence, the TCB will be moved to CPU Queue 20. Delay Queue 22 contains a list of event names, each event name associated with a delay which indicates the amount of time before the associated event will be signalled. The event names in Delay Queue 22 are prioritized, based upon their associated delay values.

Queue system 18 also includes a set of event count registers 26 that keep track of the availability of a predetermined number of possible events that can occur within the system. It is to be recalled that an event can be signaled and waited on by system tasks. The number of events that can be accommodated by the system is dictated by the size of an address and is not to be considered a limitation of the system. For purposes of description it will be assumed that the system can accommodate up to 256 possible events and utilizes an 8-bit address for any such event.

Within command and status registers 14 is a command register that is written to by microprocessor 10 to start an EXEC utility. In addition, there are a number of registers that are "read-accessible" by microprocessor 10 and contain data produced by operations within EXEC module 12. A list of those registers will be found below.

Queue state machine 16 controls the actions of EXEC module 12. Upon receipt from microprocessor 10 of an EXEC command into a register in command and status registers 14, queue state machine 16 executes the required actions on a queue or queues in queue system 18. Queue state machine 16 also performs required actions on registers in command and status registers 14 or, further, controls a timer 28 and a port control module 30. Port control module 30 provides I/O command functions for EXEC module 12. Address and data connections between microprocessor 10 and EXEC module 12 are provided directly through command and status registers module 14 via lines 31 and 33, respectively.

SIGNAL LINE DEFINITIONS.

Signal lines existing between microprocessor 10 and EXEC module 12 are as follows:

| Inputs to EXEC Module 12 |
| --- |
| CS - chip select |
| R/W - read/not (write) line |
| uPAddr (0–7) - address lines |
| SCLK - EXEC system clock (not shown) |
| NRST - External Reset line |
| NTST - Test line (for test mode operation) |
| Bidirectional lines to EXEC Module 12 |
| |
| uP Data (0–15) - data lines |
| Outputs from EXEC Module 12 |
| |
| NDTACK - data transfer acknowledge (asynchronous acknowledge) |
| NINT - interrupt line to CPU |

The following signals go between Queue State Machine 16 and each of queues 20, 22 AND 24 via bus 32 (but are not specifically illustrated in FIG. 1).

D (0–7)—EXEC Internal Data Bus
ADDR (0–15)—EXEC Internal Address Bus
CMD (0–3)—Command Lines to Queue system 18
QEN (0–3)—Queue Command Enables (one for each queue and array)

There are 256 queue elements in each queue. Each queue element stores two, 8-bit words. Therefore, 8 data lines and 9 address lines are required to access any word in any queue. The ninth address line is the CMD(3) signal line. CMD(0–2) are used to specify which of 8 different commands will be performed. CMD(3) determines which of two queue element words the operation will be performed on. QEN(0–3) lines are used to enable only one of the queues.

Commands can be sent to a particular queue to execute arithmetic comparisons. These arithmetic comparisons are done on all queue elements in parallel. The result of such comparisons is used to make parallel shifts in the queue in order to insert or delete items. This yields a significant speed improvement over manipulating these data as is typically done with pointers into a list. The following additional signals run from Queue State Machine 16 to the Event Count Registers 26 over Bus 32 (not specifically shown in FIG. 1)

ECOP (0–1)—Event Counter Operations
ECOC—Event Counter Output Control
ECCLK—Event Counter Clock
ECLR—Event Register Array Clear
EOC—Event Register Output Control These signals are used to control 256 8-bit registers in Event count registers 26 and a counter therein which can be loaded with any of these values and incremented or decremented.

Each register location in Event Count registers 26 is associated with a correspondingly numbered event. When a "Signal of a particular event occurs, the appropriate register value is read, incremented, and re-written. Likewise, when a Wait is executed on a particular event, the appropriate register's value is read, decremented, and re-written.

QUEUE STRUCTURES

Figure 2:
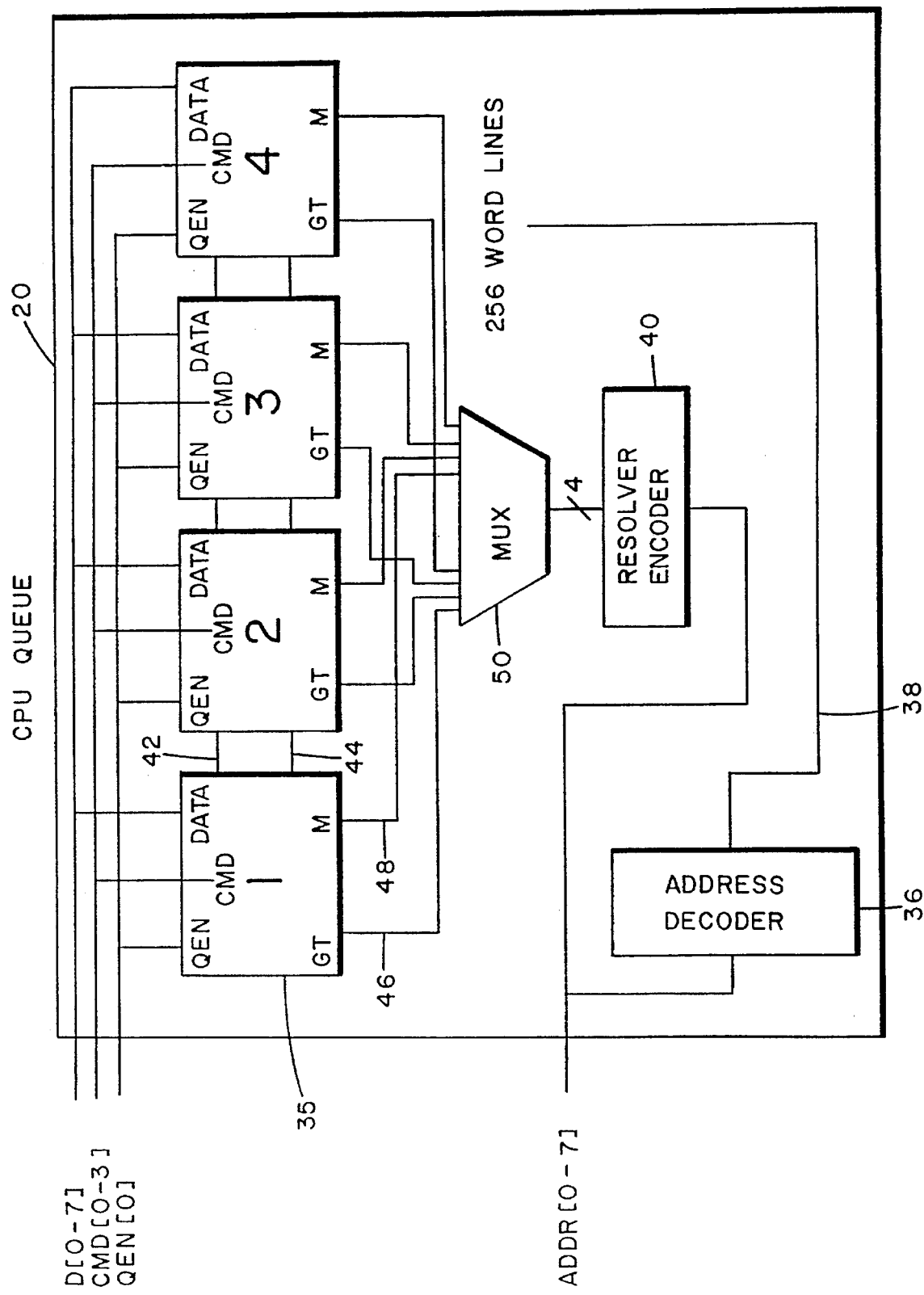
FIG. 2 is a block diagram of a CPU queue used in the system of FIG. 1.

Turning now to FIG. 2, the basic structure of CPU queue 20 is illustrated. It will be recalled, that the hardware structure of each queue is identical. TCB names are stored in CPU queue 20 in priority order. Rather than a assigning a separate priority value to a TCB name, it has been determined that substantial storage area can be conserved by assigning as a TCB name, the actual priority value assigned to the TCB. Thus, a TCB having the name 0 has the highest priority value and is referred to by an address indication in EXEC module 12 by an all-0s address. Other TCBs of lower priority are similarly denoted.

Figure 3:
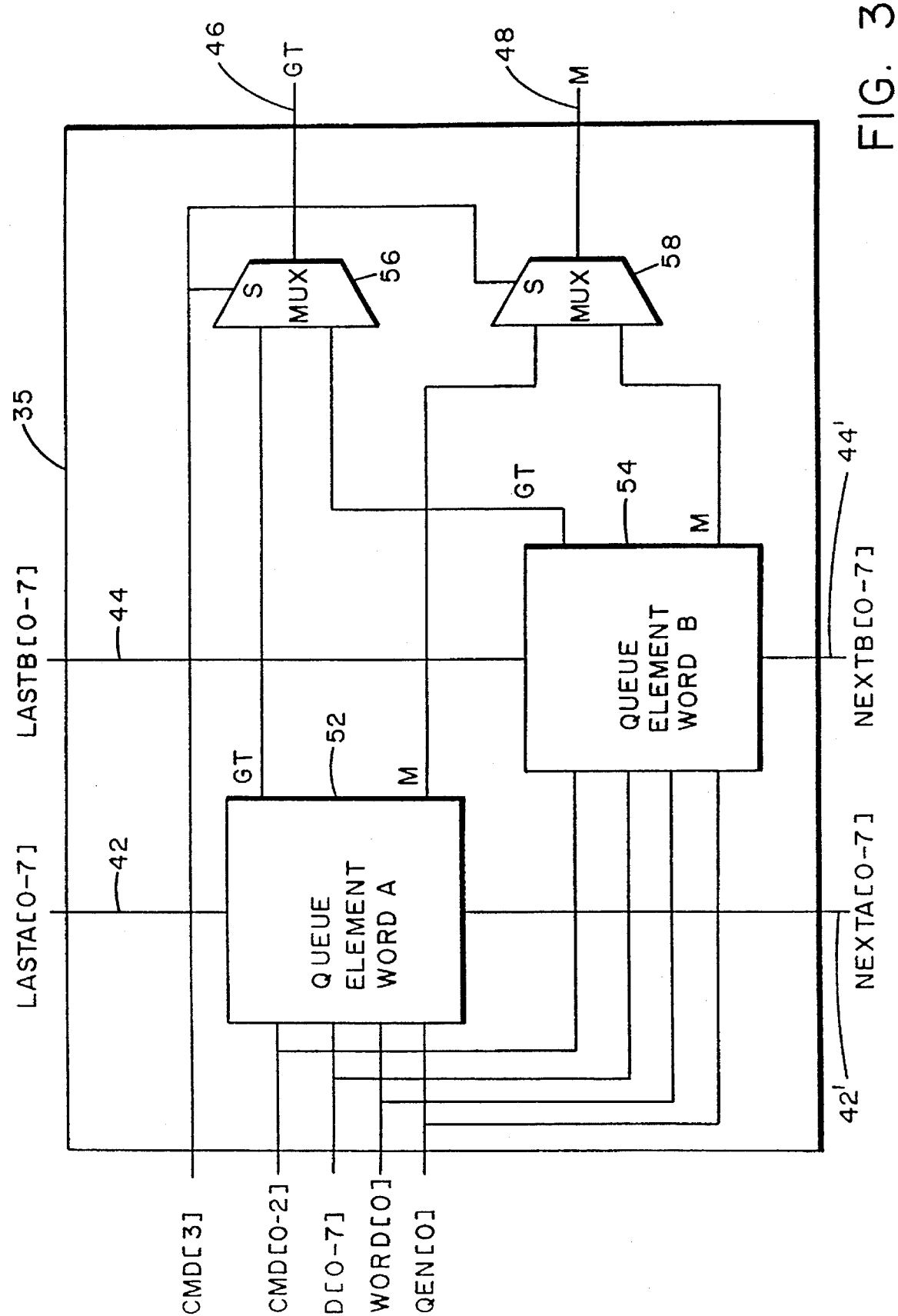
FIG. 3 is a block diagram of each queue element within the CPU queue of FIG. 2.

CPU queue 20 contains a plurality of queue elements 35. For illustration purposes, CPU queue 20 is shown with only four queue elements, instead of the 256 which can be used with an eight bit address. The structure of a queue element is shown in FIG. 3 and will be described in detail below. Data lines D(0–7) carry data into and out of data ports in each of queue elements 35 (see FIG. 2). CMD(0–3) are address lines that are used to specify which of eight different commands will be performed by each queue element 35. The CMD(3) line provides a level which determines which of two words in a queue element 35 the operation will be performed upon. QEN(0) is an enable line and enables one of the three queues (20, 22, 24).

An address bus ADDR (0–7) is decoded by address decoder 36 and is used to select an individual queue element 35 (via an output on cable 38 which contains 256 separate word lines). Each of the word lines in word bus 38 is connected to an individual queue element 35 so as to enable logical operations in any one chosen queue element in accordance with a received address into address decoder 36. Such connections are not shown in FIG. 2 to avoid overcomplication of the diagram.

Address bus ADDR (0–7) also carries address information back to queue state machine 16 during comparison operations. During such an operation, the address of a queue element 35 that meets a comparison criteria is returned on address bus ADDR (0–7).

A resolver/encoder 40 resolves the case where more than one queue element 35 meets a comparison criteria. For instance, if a command is issued to return an address of a queue element that contains "numeral 0" and all queue elements contain "0", then resolver encoder 40 causes address bus ADDR 0–7 to return the lowest numbered queue location to queue state machine 16. In the example given, resolver encoder 40 would return location 1 on address bus ADDR (0–7).

Each queue element 35 contains two words of information pertaining to a task. In general, queue element 35 at position 1 in CPU queue 20 will contain two words pertaining to the highest-priority task awaiting action. Those words are the TCB name having the lowest numerical value (priority) and the name of the event that caused the TCB name to be moved into CPU queue 20. Queue elements at position 3, 4 etc. will contain TCB names with lower priority (and higher numerical value).

There are two local buses 42 and 44 that connect each queue element 35 to its next higher-numbered neighbor queue element and are used when inserting or deleting items from a queue. Each queue element 35 has two comparison operations incorporated into its structure, the results of which are manifest at GT output 46 and M output 48. The signals "GT" and "M" stand for "greater than" and "match", respectively. In brief, when data is applied to data bus D(0–7), each queue element 35 determines whether a data word contained within it matches in value or is greater in value in relation to the applied data word. If it finds that its stored word value is greater than the data bus value, then an output is impressed on output GT line 46. If a match is found between the values, M output 48 is energized. A multiplexer 50 is connected to all queue elements 35 and is controlled to select either all "greater than" outputs 46 from queue elements 35 or all "match" outputs 48 from queue elements 35. In the example shown in FIG. 2, multiplexer 50 provides four outputs from the selected greater than or match outputs from the four queue elements 35 shown. Which group of signals is selected is dependent on whether it is desired to know the lowest-numbered queue element 35 that matches the input data or the lowest-numbered queue element 35 that holds a value greater than the input data.

QUEUE ELEMENT STRUCTURE

Figure 4:
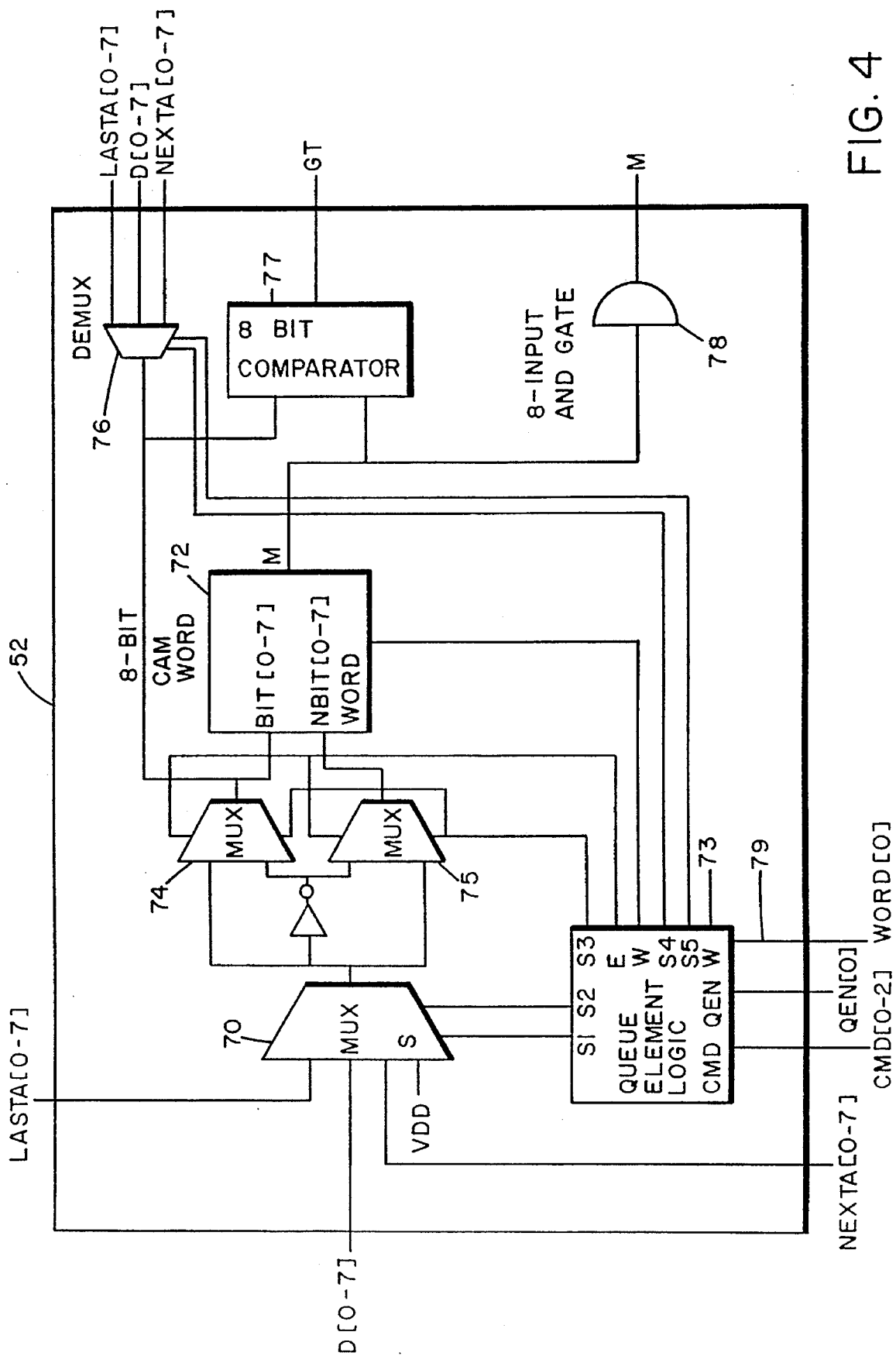
FIG. 4 is more detailed logic of a word store within a queue element word of FIG. 3.

Turning now to FIG. 3, the structure of a queue element 35 is illustrated. In each queue element 35, a pair of word stores 52 and 54 hold two 8-bit values, i.e., word A and word B. In addition, each word store contains the necessary logic to enable a comparison to be made between an incoming data word and the word contained therein. Details of that logic structure are shown in FIG. 4 and will be further considered below.

A queue element 35 holds the following information:

| Queue Name | Word A | Word B |
|---|---|---|
| CPU Queue | Task Name/Priority | Event Case |
| Event Queue | Task Name/Priority | Event Name |
| Delay Queue | Delay Value | Event Name |

The Task name/priority is manifest by a TCB name whose value is directly related to its priority (as above described). An "Event Case" is the event name value that occurred that caused the task denoted by a TCB in word A, to be moved into CPU queue 20. An "Event Name" is a name or value given to a specific action within microprocessor 10. For instance, an event name may be a value assigned to a hardware interrupt, an I/O interrupt, etc. A "Delay Value" is a value assigned to a time before an event is to occur.

Each word store 52, 54 has a GT and M output that is applied, respectively, to multiplexers 56 and 58. The CMD (3) line is applied to multiplexers 56 and 58 and its level selects which word (word A or word B) is compared to provide the desired output on either GT line 46 or M line 48.

LAST busses 42 and 44 and NEXT busses 42' and 44' are used to shift words between queue elements 35. Each word store 52, 54 has its own LAST and NEXT bus that allows the contents of an entire queue element 35 to be shifted in one parallel operation. The contents of a word store 52 and a word store 54 always occupy the same queue element 35 together.

WORD STORE STRUCTURE

In FIG. 4, the details of a word store 52 is illustrated. A multiplexer 70 receives four sources of input data for word store 52 (word A). Those sources are as follows:

LAST A(0–7)—Contents of next lower Queue Element Word

D(0–7)—EXEC Internal Data Bus

NEXT A(0–7)—Contents of next higher Queue element Word A

VDD—used to precharge BIT and nBIT (complement) lines during a comparison in a content-addressable memory 72.

Content addressable memory (CAM) 72 contains eight, parallel connected bit cells for word A. Each bit cell provides both true and complement outputs for its respective bit. A pair of multiplexers 74 and 76 enable a comparison operation to be carried out with respect to the 8-bit word held in CAM 72.

Figure 5:
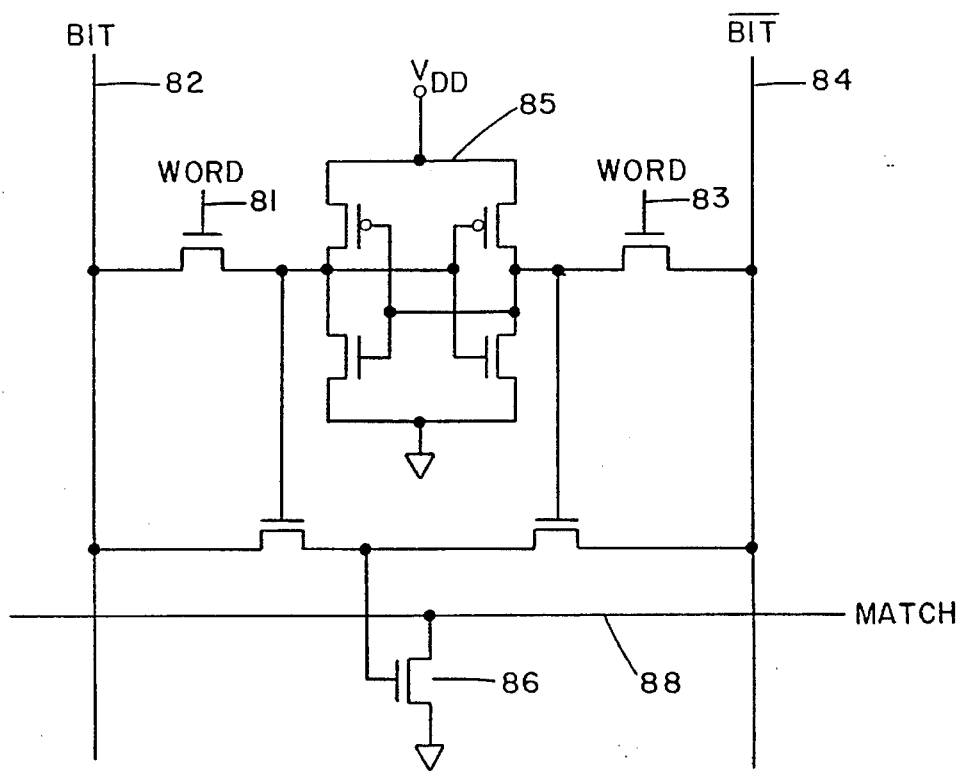
FIG. 5 is a circuit diagram of a content addressable memory cell.

The details of a one-bit CAM cell are shown in FIG. 5. Bit lines 82 and 84 are separate, but the word lines 81 and 83 of all eight one-bit CAM cells are tied together (not shown) to form a common 8-bit word line. The basic memory cell is a CMOS flip-flop 85 of known structure. To write into cell 85, data is placed on bit line 82 and complement data is placed on complement bit line 84. Then, word lines 81, 83 are asserted causing cell 80 to switch in accordance with the applied inputs. A read operation commences by precharging bit and bit complement lines 82 and 84. Word lines 81, 83 are then asserted and bit line 82 manifests the value of the cell.

For a comparison operation, true data against which comparison is to be made is applied to complementary bit line 84 and complement data is placed on bit line 82. If the applied data matches that in cell 85, then a match transistor 86 remains in a nonconductive state, thereby enabling match line 88 to be unaffected by the state in cell 80. There is one match line 88 in each memory cell.

Returning to FIG. 4, a queue element logic module 73 receives a plurality of commands over CMD(0–2) lines decodes each command using wired logic and accordingly energizes one or more of its output lines S1–S5, E and W. The output lines from queue element logic module 73 are applied to multiplexers 70, 74, 75, content addressable word memory 72 and a de-multiplexer 76 to enable a received command to be performed.

A comparator 77 examines the Match line outputs from CAM 72 and data inputs appearing on data bus D(0–7) to determine if received data has a greater value than that stored in word store 72. Comparator 77 includes an exclusive NOR input stage (not shown) which reconstructs the stored data word from the Match line outputs and enables a subsequent magnitude comparison of the input values. If the input data is less in value than the stored word, the GT output from comparator 77 is asserted. If the input data is equal in value to the stored word, AND gate 78 asserts its M output.

QUEUE COMMANDS

Each word store 52/54 responds to the following commands:

Match=—return highest-numbered location containing the compared word

Match>—return highest-numbered location containing the next higher value than the compared word SR—shift contents of queue right (to next higher-numbered location)

SL—shift contents of queue left (to next lower-numbered location)

RD—read contents of addressed Word Store onto D(0–7)

LD—load D(0–7) into addressed Word Store

Init—initialize all queue element words to value=all 1's.

The "Match" commands are comparison commands and are executed in every queue element in a queue with respect to a selected word store (word A or word B). The RD and LD commands are only executed on one addressed word in a queue. The SR and SL commands both contain addresses which indicate a queue element word store from which data shifting is to occur. Thus, SR and SL shift commands only execute within queue elements whose address location is equal to or greater than the specified address. The selective shift operation is enabled by feeding the specified address from Queue State machine 16 to address decoder 36 (FIG. 2) in the respective queue. Address decoder 36 responds to the address by activating the required word lines on bus 38 which feed into each queue element (e.g., Word (0) which feeds into queue element logic module 73 in FIG. 4).

The Init command is used to initialize all word stores in a queue to the 1 state. This value indicates that a queue element is empty.

Returning to FIG. 4, the operations of Word store 52 in response to the Match =, RD, LD and SR commands will be considered.

The Match = command is initiated by appropriate values being emplaced on CMD(0–2) and QEN(0) lines flowing into queue element logic module 77. Those values indicate a Match = command for the specific queue in which word store 52 is present. The data value to be matched is presented to word store 52 on the D(0–7) lines from the data bus. Queue element logic module 73 activates output signals S1 and S2 to cause multiplexers 70 to pass the D(0–7) inputs to multiplexers 74, 75. Signal S3 from queue element logic module 73 is asserted and selects D(0–7) to flow to NBIT(0–7) input to word store 72. Signal S3 further causes the complement of D(0–7) to flow to the BIT(0–7) input to word store 72. If D(0–7) matches the value held in word store 72, resulting outputs on the Match lines cause AND gate 78 to assert Match output M.

Assume now that a Read Contents (RD) instruction appears over the CMD(0–2) lines accompanied by a QEN(0) enable signal. Queue element logic module 73 interprets these levels as an RD-A (read) word A command. An applied level to word(O) input to queue element logic module 73 indicates that this particular queue element's word A will be read onto data bus D(0–7). The read operation is initiated by pre-charging (raising to the logical 1 state) the bit lines to each bit cell in word store 72. This is accomplished by tri-stating outputs from multiplexers 74 and 76 with an assertion of the E line from queue element logic module 73. The word line to each bit cell in word store 72 is then asserted and the 8-bit values stored therein are read onto data bus D(0–7) through demultiplexer 76 under control of signals S4 and S5 from queue element logic module 73.

A Load (LD) command is commenced by command values applied onto CMD(0–2) inputs to queue element logic module 73, accompanied by a QEN(0) enable signal. An assertion of the word(O) input to queue element logic module 73 indicates that this particular queue element word A will be loaded from data bus D(0–7). In response to the LD command, queue element logic module 73 asserts signals S1 and S2 to multiplexer 70 which, in turn, causes the D(0–7) inputs to be connected to the input of multiplexers 74 and 75. Levels asserted on the S3 and S4 outputs from queue element logic module 73 then select the data values D(0–7) and their complements to be connected to bit (0–7) and NBIT (0–7) inputs to word store 72, respectively. Word line W from queue element logic module 73 is then asserted and causes storage of the data values into word store 72.

To accomplish a Shift Right command (SR), the CMD(0–2) lines are asserted with the proper command values accompanied by an enable signal on QEN(0). Word line word (0) is asserted indicating that this particular queue element word A will be part of a partial or total queue position shift. An SR (or SL) command is a concatenation of the above described RD and LD commands. The only differences are logic signals S4 and S5 from queue element logic module 73 select NEXTA(0–7) as outputs of the read function and the S1 and S2 outputs select LASTA(0–7) as inputs for the load (for the SR command).

A parallel operation Shift Right is achieved by reading all queue element words simultaneously onto the separate NEXTA buses, and then simultaneously loading all queue element words from their separate LASTA buses. While not expressly shown, each queue elements NEXTA bus is connected to the next higher-position queue element's LASTA bus. From the above, it can thus be seen that shifts of data between queue elements occur in parallel and simultaneously and may occur between selected queue elements or between all queue elements in a queue.

EVENT COUNT REGISTERS

Figure 6:
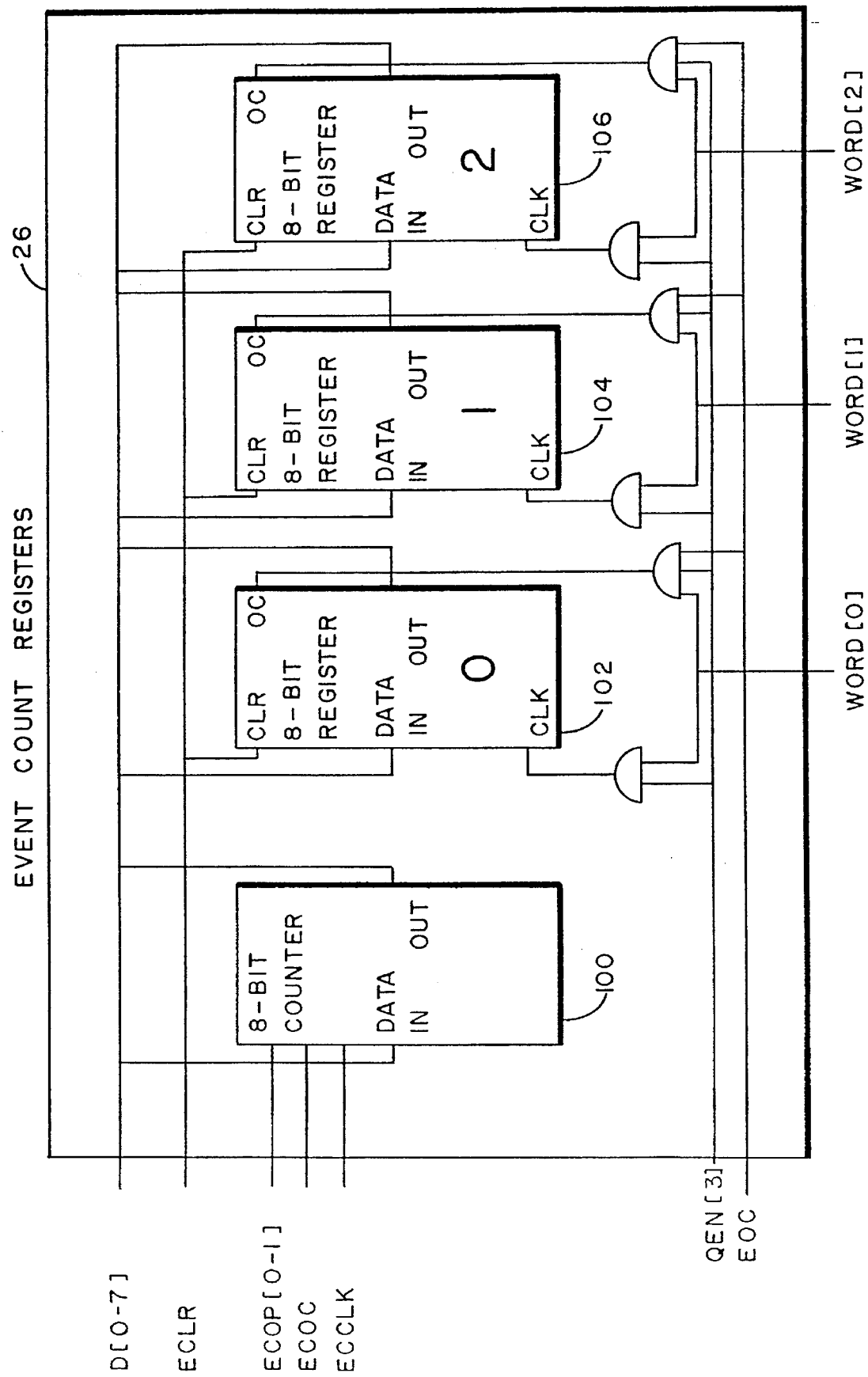
FIG. 6 is as block diagram of a set of event count registers used with the invention.

EXEC module 12 includes 256 event count registers 26, one for each possible event (as limited by an 8-bit address). In FIG. 6, an 8-bit event counter 100 and the first three event count registers 102, 104 and 106 are shown. Event counter 100 is programmable and responds to either an event count being loaded via data bus D(0–7) or to an event count from one of registers 102, 104 or 106.

Each event count register has an assigned value indicative of one of 256 events which can occur in the system. If a register indicates a plus count, that is an indication that multiple tasks are waiting for the event to occur. If the event count register indicates a negative value, the indication is that the event has been signalled (occurred) more times than there are tasks waiting for the event's occurrence. Upon the occurrence of an event, the event count register corresponding to that event is examined to see the state of its count. If the count is seen to be positive, then queue state machine 16 knows that a task is present in event queue 24 and is awaiting the occurrence of the specific event. In such a case, event queue 24 is searched, in parallel, to find all TCBs that specify the specific event. The highest priority TCB that specifies the event is then chosen for execution. Queue state machine 16 transfers the chosen TCB from event queue 24 to CPU queue 20, where it is placed in priority order. When the task is removed from event queue 24, the value in the event count register is decremented through the action of counter 100.

When an event occurs, the Signal utility causes the value of the corresponding event count register to be read and used to program counter 100. Then, counter 100 decrements the value, which decremented value is then written back into an appropriate register. A Wait utility causes the same sequence to occur with the exception that the value is decremented. The value of any event count register (102, 104, 106, etc.) is available to be read by queue state machines 16 via data bus D(0–7). The following command lines from queue state machine 16 are applied to counter 100.

ECOP(0–1) are used to specify whether counter 100 should increment, decrement, load, or clear.

ECOC is used to enable the output from counter 100 onto the data lines D(0–7)

ECCLK is the clock used to cause an operation on counter 100.

ECLR is used to initialize all event count registers 102, 104, 106, etc. to 0.

DELAY TIMER

Figure 7:
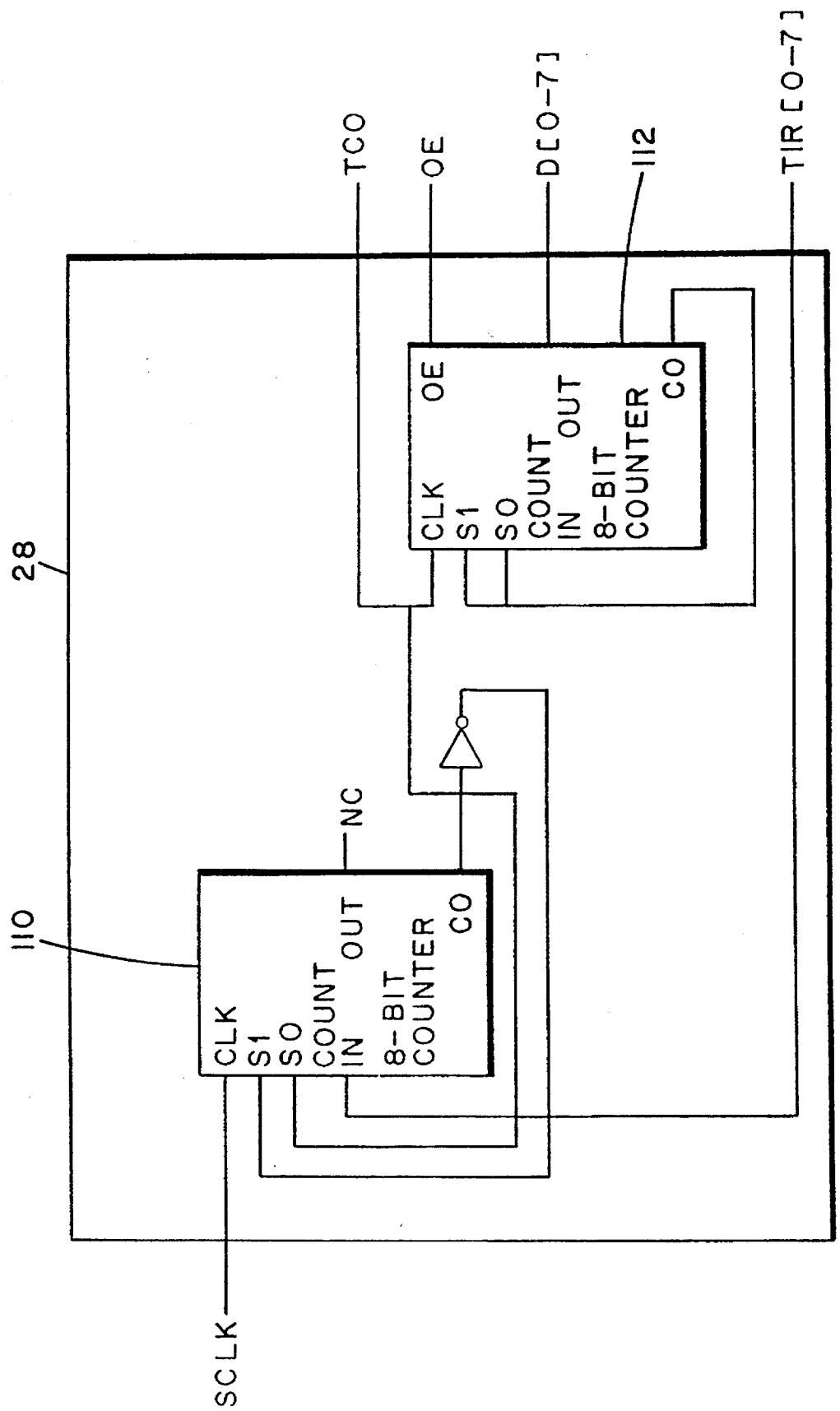
FIG. 7 is a block diagram of a delay timer used with the invention.

In FIG. 7, the details of delay timer 28 in FIG. 1 are shown. Delay timer 28 counts system clock cycles and causes queue state machine 16 to signal any event whose delay is up. The number of clock cycles in a delay unit (i.e. a unit of delay time) is programmable and is held in a timer interval register within command and status registers 14. The delay unit value comes into an 8-bit counter 110 in delay timer 28 on TIR(0–7) lines from the timer interval register. 8-bit counter 112 counts the number of delay units by accumulating the number of clock cycles in each delay unit and then incrementing to a next delay unit count. 8-bit counter 112 counts up to 255 and then rolls over to 0. The Delay utility delays events by a relative time, not an absolute time.

COMMAND AND STATUS REGISTERS

Figure 8:
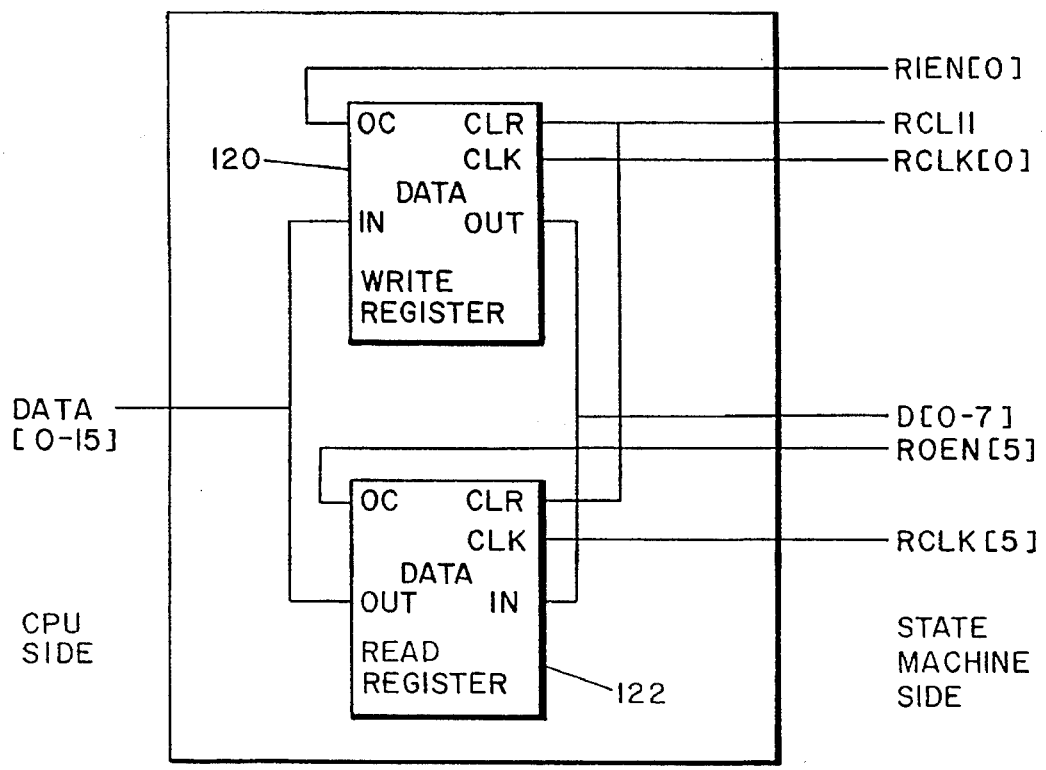
FIG. 8 is an exemplary set of read/write registers contained within the command and status registers shown in FIG. 1.

With reference to FIG. 1, command and status registers comprise a number of microprocessor-accessible registers which receive 16 bit data (and commands) from microprocessor 10 and 8-bit data from various of the elements within EXEC module 12. All registers are 16 bits in width and each register is either readable or writeable, but not both. For instance, in FIG. 8, examples of a write register 120 and read register 122 are shown along with their interconnections and control circuitry. Register 122 is a read register and receives data from EXEC module data bus D(0–7). Such data may subsequently be read out to microprocessor 10 upon application of enable signal ROEN(5). Similarly, write register 120 receives data from microprocessor 10 and upon application of an enable signal RIEN(0), provides such data as an output on data bus D(0–7).

The following is a list of microprocessor accessible registers (not shown) within command and status registers 14 and a description of the respective register's operation during execution of an associated utility operation.

Schedule Register (a Write Register): When a Task TCB is written to this register, the TCB is placed in CPU Queue 20 according to its priority (TCB value).

Suspend Register (a Write Register): When a Task TCB is written to this register, the TCB is removed from CPU Queue 20; if it is indeed in CPU Queue 20. If the TCB is not in CPU Queue 20, an interrupt condition is generated to microprocessor 10. Status indicating this condition is set in a Status Register.

Signal Register (a Write Register): When an Event control block is written to this register from microprocessor 10, this event is signalled. If no task is waiting for this event, the only action taken is to decrement the Event Count for this event. If tasks are waiting for this event, then the TCB with the highest priority (lowest TCB value) is removed from Event Queue 24 and placed in CPU Queue 20.

Wait Register (a Write Register): When an Event control block is written to this register from microprocessor 10, the running task's TCB is placed in Event Queue 24 to wait for the named event. The running task's TCB is found at the first queue position in CPU Queue 20 (position 0). This TCB is removed from CPU Queue 20 and placed in Event Queue 24 according to its priority (TCB value).

Delay Register (a Write Register): When an Event control block and an 8-bit delay value is written to this register from microprocessor 10, the Event control block name is placed into Delay Queue 22, prioritized by its delay value. The lower the delay, the closer to the head of the queue this block name is placed.

Status Register (a Read Register): The Status register contains information on any abnormal conditions that occur within the EXEC chip.

Timer Interval Register (a Write Register): The user writes a 16-bit value to this register which represents the number of system clocks that make up each delay value.

CPUQ Register, Event Q Register, Delay Q Register (Read Registers): These registers, when read by microprocessor 10, will sequentially give the contents of all the Queue Element Words in the appropriate queue. These are Diagnostic Registers.

Diagnostic Pointer Register (a Write Register): When written to with a value, the diagnostic registers above when read will be set to read from this location within the queues.

Active TCB Register (a Read Register): When read, the TCBName of the current task that has highest priority in the CPU Queue is returned.

Event Case Register (a Read Register): When read, the Event control block Name of the event that caused a task to resume execution is returned. This value only has meaning if this task has executed a Wait utility call.

QUEUE STATE MACHINE

Queue state machine 16 controls the workings of EXEC Module 12. Queue state machine 16 is, in turn, controlled by internal hardware that responds to commands written to command and status registers 14, to sequentially energize control lines to cause system operations in accordance with a specified command. In all respects queue state machine 16 is conventional and its arrangement is known to those skilled in the art.

EXEC MODULE OPERATION-SCHEDULE UTILITY

Assume that microprocessor 10 writes a TCB of a task that it wishes to schedule, to the Schedule Register within command and status registers 14 in EXEC module 12. The TCB value is thereby latched within the Schedule register. In response, queue state machine 16 performs a parallel search of CPU queue 20 to find a stored next lower priority TCB from the TCB being scheduled. Once found, the TCBs within CPU 20 are shifted one position to the right, starting from the incoming TCB's queue position. The position within CPU 20 vacated by this rightward shift is loaded with the TCB of the task to be scheduled.

EXEC module 12 now asserts a handshake signal NDTACK from Port control 30 to indicate that the transaction may now be terminated. In response, microprocessor 10 de-asserts its CS signal to Port control 30, which signal precedes every transaction with EXEC module 12.

CPU queue 20 has now been modified so that the TCB name of the task to be scheduled is present in CPU queue 20 in its proper priority position. Microprocessor 10, to determine what is now the highest-priority task awaiting execution, reads the Active TCB register from command and status registers 14. Microprocessor 10 may also read the Event case register. The access by microprocessor 10 to the Active TCB register causes queue state machine 16 to read the TCB name from the first queue element (highest priority) in CPU queue 20 and to place this value onto microprocessor data lines DATA (0–15). Port control 30 then asserts the NDTACK line to indicate that the value of the active TCB register is available to microprocessor 10.

It will be recalled that the Event case is the name of the event that caused a name of a task to be moved into CPU queue 20. Microprocessor 10 can access the Event case register to determine the event value within CPU queue 20. This access causes the event name to be read from the first queue element in CPU queue 20 into the Event case register and thence to be placed on microprocessor 10's data bus DATA(0–15). The signal NDTACK is asserted indicating to microprocessor 10 that the value of this register is available on the output data bus.

QUEUE STATE MACHINE OPERATION—SCHEDULE UTILITY

The following are states that occur during a Schedule utility. Inputs to Queue state machine 16 are in lower case and outputs are uppercase. All events are synchronized to the system clock. For each state that is not exited until a particular event occurs, the event is indicated. If no event is specified for a given state, the state is exited upon the next state machine clock.

1. IDLE—EXEC chip select (cs) is not asserted, ntst is not asserted, nrst is not asserted, timer carry out (tco) is not asserted. Event—Chip select (cs) is asserted, CPU wishes to make an operating system call.
2. CMD RCVD—an EXEC command is received. Actions—The schedule Register latches the value the CPU provides on the uP Address lines. This value is the TCBName of the task that is to be scheduled for execution.
3. SETUP MATCH CMD—Begin the Schedule utility. Setup for a "Match>." command. Actions—CMD(0–3) lines set up with the command "Match>A." D(0–7)

lines get the value in the Schedule Register. QEN(0–3) is set to the CPUQ value to indicate that this action takes place on the CPU Queue.

4. FINISH MATCH CMD—Assert the "MATCH" line. Actions—De-assert last state's actions and assert the MATCH line.

5. READ MATCH>ADD—Read address lines for highest priority match>address. Actions—Store the value on ADDR(0–7) in a temporary register, and de-assert the MATCH line.

6. SETUP SR CMD—Setup for a shift right command. Actions—Put value in temporary register out on ADDR(0–7) lines. Set CMD(0–3) lines to "SR" (Shift Right) command, and set QEN(0–3) lines equal to CPUQ value (to indicate action on CPU Queue).

7. FINISH SR CMD—Finish the Shift Right command. Actions—De-assert last actions.

8. SETUP LD CMD—Setup for a "LD" (load) command. Actions—CMD(0–3) lines gets the "LDA" command value. D(0–7) lines gets the contents of the Schedule Register. ADDR(0–7) lines get the value in the temporary register. QEN(0–3) lines are set equal to the CPUQ value (to indicate action on the CPU Queue).

8. FINISH LD CMD—Finish the load command. Actions—De-assert the actions of the last state.

10. SETUP END uP XACTION (Setup to end transaction with CPU. Actions—DTACK (data transfer acknowledge) is asserted. Event—cs is de-asserted.

11. END uP XACTION—End transaction with CPU. Actions—DTACK (data transfer acknowledge) is de-asserted.

12. IDLE—GO to state 1 above.

At this time, the task's TCB has been placed in the CPU Queue. In order to use the updated queue information, microprocessor 10 must execute a "READ$_{13}$ACTIVETCB" command. In addition, microprocessor 10 may execute a "READ$_{13}$EVENTCASE" in order to determine the event that caused this task to resume execution. These actions are performed for any utility call including Schedule, Suspend, Signal, Wait, and Delay.

READ$_{13}$ACTIVETCB Command

1. IDLE—EXEC chip select (cs), ntst, nrst, and tco (timer carry out) all are de-asserted.

2. SETUP RD CMD—Setup for a "RD" (read) command. Actions—CMD(0–3) lines get the command "RDA" (read word A). The QEN(0–3) lines get the CPUQ value. ADDR(0–7) lines are set equal to 0 (for the first location in the CPU Queue—the Queue Head).

3. WRITE ACTIVETCB REG—Write the Active TCB Register with the TCBName at the head of the CPU Queue. Actions—The Active TCB Register is written with the value now appearing on the D(0–7) lines. This is the TCBName of the next task to have use of the CPU resource by virtue of its priority.

4. SETUP END uP XACTION—Setup to end transaction with CPU. Actions—DTACK (data transfer acknowledge) is asserted. Event—cs is de-asserted.

5. END uP XACTION—End transaction with CPU. Actions—DTACK (data transfer acknowledge) is de-asserted.

6. IDLE (state 1 above)

READ_EVENTCASE Command

1. IDLE—EXEC chip select (cs), ntst, nrst, and tco (timer carry out) all are de-asserted.

2. SETUP RD CMD—Setup a "RD" (read) command. Actions—CMD(0–3) is set to the "RDB" (read word B) value. QEN(0–3) is set to the CPUQ value. ADDR(0–7) lines are set to 0. We wish to read word B of the first element in the CPU Queue 3. WRITE EVENTCASE REG—Write the EventCase Register with the EventCase value of the next task to execute on the CPU. Actions—The EventCase Register is set equal to the value of the lines D(0–7). Actions of last state are de-asserted.

4. SETUP END uP XACTION—Setup to end transaction with CPU. Actions—DTACK (data transfer acknowledge) is asserted. Event—cs is de-asserted.

5. END uP XACTION—End transaction with CPU. Actions—DTACK (data transfer acknowledge) is de-asserted.

6. IDLE (state 1 above)

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A multitasking data processing system including a hardware-configured portion of an operating system, the combination comprising:

processor queue means configured in hardware and including a plurality of word stores, for storing in priority order, task names ready for execution;

event queue means configured in hardware and including a plurality of word stores, for storing task names that await an occurrence of an event to be placed in said processor queue means; processor means for signalling occurrence of an event; and match logic means configured in hardware and responsive to an asynchronously signalled event from said processor means for searching said word stores in parallel in said event queue means to find a task name associated with said signalled event occurrence, and for transferring said task name to said processor queue means.

2. The multitasking data processing system recited in claim 1, further comprising:

shift logic means for simultaneously transferring a plurality of task names from one set of word stores to another set of word stores in said processor queue means.

3. The multitasking data processing system recited in claim 2, wherein said shift logic means includes means for simultaneously transferring said plurality of task names from word stores in a first direction along said queue or in the opposite direction along said queue, in dependence upon a generated command signal from said processor means.

4. The multitasking data processing system as recited in claim 3, wherein said shift logic means, in response to an address of a said word store, causes said simultaneous transfer of task names to commence from said addressed word store and to include task names in additional word stores along said processor queue, starting from said addressed word store.

5. A multitasking data processing system recited in claim 1, further comprising:

hardware event count means, including a plurality of registers, each register storing a count of tasks awaiting said asynchronously signalled event from said processor means; and search means responsive to said asynchronously signalled event to search said registers in parallel in said hardware event count means to determine whether a task is awaiting said asynchronously signalled event, and if so, operating said match logic means to search said event queue means to find a name of a task awaiting said asynchronously signalled event.

6. A multitasking data processing system recited in claim 5, wherein each said word store in said event queue means stores a task name and an associated event name, an occurrence of said named event causing said named task to be transferred to said processor queue means.

7. A multitasking data processing system recited in claim 6, wherein task names in said event queue means are stored in a priority order assigned to each task, and a parallel search of said event queue means by said match logic means causes a readout of all task names associated with a signalled event, in parallel and in priority order.

8. A multitasking data processing system recited in claim 5, wherein said search means further determines, for a signalled event, if more events have occurred than there are tasks awaiting such event's occurrence.

9. A multitasking data processing system as recited in claim 1 further comprising:

hardware delay queue means including a plurality of word stores, each word store storing a delay interval value and an event to be signalled by said processor means upon occurrence of said delay interval value;

timer means for signalling delay interval values;

means responsive to a delay interval value signalled by said timer means for searching word stores in said delay queue means, in parallel, to find an event to be signalled upon a signalling of a delay interval value and to transmit said signalled event to said match logic means.

10. A multitasking data processing system as recited in claim 1 wherein each said task name is represented by a unique value, said value also indicating said named task's priority among all tasks.

11. A hardware-configured operating system kernel, comprising:

a set of command and status hardware registers for receiving both addresses and data from a connected data processing system and for passing data to said data processing system;

a CPU queue including a plurality of hardware word stores for storing a queue of task names, said queue of task names organized in priority order of said named tasks, all said tasks being ready for execution;

a hardware-configured event queue including a plurality of word stores for storing a queue of task names in priority order, each said task name stored in association with an event name upon whose occurrence, said associated task name will be ready for execution; and a queue state machine responsive to asynchronously occurring event data in said command and status registers, to cause a parallel search of said event queue to find all task names associated with said asynchronously occurring event data, and to enable a transfer of said task names to said CPU queue.

12. The kernel as recited in claim 11, wherein said queue state machine causes said task names to be stored in said CPU queue in task name priority order.

13. The kernel as recited in claim 12, wherein each said task name is a unique value, said value indicative of said named task's priority.

14. The kernel as recited in claim 13, further comprising:

a delay queue including a plurality of word stores for storing a queue of delay interval values and associated event names, said event names ordered in said delay queue by increasing value of associated delay interval values, said queue state machine responsive to a delay interval value manifestation to cause an associated event name to be signalled and task name transfers from said event queue to be enabled.

15. The kernel as recited in claim 14, further comprising:

address means connected to each word store in each said queue for enabling data to be selectively read from or written into any said word store.

16. The kernel as recited in claim 15, further comprising:

bus means connecting each said word store in each said queue for enabling simultaneous data transfers between selected word stores.

17. The kernel as recited in claim 16, further comprising:

a plurality of event registers, one for each of a plurality of events, each said event register indicating a count of tasks awaiting occurrence of an event, said queue state machine responsive to a signalled event to search all said event registers in parallel to determine if any tasks were awaiting occurrence of said signalled event, and if so, to cause transfer of a highest priority task name associated with said event in said event queue.

* * * * *